United States Patent [19]

Spradley, Jr. et al.

[11] Patent Number: 5,155,490

[45] Date of Patent: Oct. 13, 1992

[54] GEODETIC SURVEYING SYSTEM USING MULTIPLE GPS BASE STATIONS

[75] Inventors: Lewis H. Spradley, Jr.; John P. Wincelowicz, Jr.; David H. Spradley, all of Houston, Tex.

[73] Assignee: GPS Technology Corp., Houston, Tex.

[21] Appl. No.: 598,389

[22] Filed: Oct. 15, 1990

[51] Int. Cl.⁵ .................... G01S 5/02; H04B 7/185
[52] U.S. Cl. .................... 342/357; 342/358
[58] Field of Search .................... 342/356, 357, 358

[56] References Cited

U.S. PATENT DOCUMENTS

| | | | |
|---|---|---|---|
| 4,550,601 | 11/1985 | Evans | 73/382 |
| 4,667,203 | 5/1987 | Counselman | 342/357 |
| 4,809,005 | 2/1989 | Counselman, III | 342/352 |
| 4,847,862 | 7/1989 | Braisted et al. | 375/357 |
| 4,849,662 | 1/1990 | Counselman | |
| 4,870,422 | 9/1989 | Counselman, III | 342/357 |
| 4,924,448 | 5/1990 | Gaer | 367/88 |
| 4,932,036 | 6/1990 | Goradia et al. | 375/1 |

OTHER PUBLICATIONS

Perreauh, "Civilian Receivers Navigate by Satelite", MSN vol. 11, #1, Jan. 1981.
Buennagel et al., "Series Project: Final Report on Research and Development Phase", 1979–1983, JPL Publication 8416, Mar. 1984, pp. 1–46.
Bock et al., "Establishment of Three Dimensional Geodetic Control by Interferometry With the GPS," Journal of Geophysical Research, vol. 90, #139 Aug. 10, 1985.
Wide Area Differential GPS, Changdon Kee, Bradford W. Parkinson; Navigation: Journal of The Institute of Navigation, vol. 38, No. 2, Summer 1991.
Alfred Leick, GPS Satellite Surveying, John Wiley & Sons, Inc. New York 1990.
Chang Kee, Parkinson & Axelrad, Wide Area Differential GPS, ION Sep. 1990.
Jeff Hurn, GPS a Guide to the Next Utility, Trimble Navigation, Sunnyvale, CA 1989.
L. Harold Spradley, Developing Petroleum Maps for the Future.
Philip J. Klass, First Production GPS Receiver Delivered Ahead of Schedule, Aviation Week & Space Technology, Sep. 21, 1987, vol. 127, No. 12, page 93.
John T. Merrifield, Fifth—Generation GPS Receiver Aims at Commercial Market, Aviation Week & Space Technology, Aug. 19, 1985, vol. 123, No. 7, page 123.
Alexander E. Braun, The GPS Promise Approaches Fulfillment, Journal of Electronic Defense, Nov. 1989, vol. 12, page 52.
1988 Marketing Directory and Buyer's Guide, Defense Electronics, vol. 20, No. 4, p. 47, Apr. 1988.
29th Marine Buyers' Guide Issue, Boating Industry, vol. 51, page 11, Dec. 1988, vol. 51, page 11.

(List continued on next page.)

Primary Examiner—Gregory C. Issing
Attorney, Agent, or Firm—Arnold, White & Durkee

[57] ABSTRACT

An improved system and method for determining a position fix in space and time using the Global Positioning System (GPS) satellite network signals. The system comprises at least three fixed base stations each having a satellite receiver operating in conjunction with a highly accurate (atomic-standard) clock. Each base station's position is known with great accuracy. GPS satellite signals are collected over statistically significant periods of time at each base station and fitted to determine with the clock offset and drift of the station clocks, thus establishing a "network" of base station clocks that in the aggregate is of great accuracy and precision. An arbitrary number of mobile receiver stations similarly collect data for working periods of statistically significant duration; these data are used in conjunction with the base station data to compute position fixes for the mobile stations.

6 Claims, 3 Drawing Sheets

OTHER PUBLICATIONS

*30th Marine Buyers' Guide Issue,* Boating Industry, vol. 52, p. 9, Dec. 1989.
*1986 Marketing Directory and Buyers' Guide,* Defense Electronics, Feb. 1986, vol. 18, p. 71.
Marc E. Vaucher, Kelly Robertson, The Space Shuttle Accident Forces Companies to Change Plans, *Commercial Space,* Fall 1986, vol. 2, No. 3 p. 42.
*Navstar Global Positioning System Fact Sheet,* United States Air Force Systems Command, Space Division, Office of Public Affairs, Los Angeles AFB, California, Aug. 1990.
*GPS Navstar Global Positioning System User's Overview,* YEE-83-009B, Space Navigational Systems Navstar GPS Joint Program Office, Los Angeles, California, Sep. 1986.
*Satellite Positioning Corporation Geodetic Survey Products,* GPS Technology Corporation, Houston, Texas, 1989.

GEODETIC SURVEYING SYSTEM USING MULTIPLE GPS BASE STATIONS

Table of Contents

1. Background of the Invention
   1.1 The GPS System
   (a) PRN Code Information Signals
   (b) Computation of Position Fixes Using GPS Signal Data
   (c) Atomic-Clock Timing of Satellite Signals
2. Summary of the Invention
3. Brief Description of the Drawings
4. Detailed Description of Specific Embodiments
   4.1 System Components
   (a) Base Stations
   (b) Remote Station
   (c) Data Processor
   4.2 Data Collection Using the Illustrative System
   4.3 Introduction to Data Processing Aspects
   4.4 Time Synchronization of Station Clocks
   (a) Overview: Obstacles to Synchronization
   (b) Selection of Reference Base Station
   (c) Computation of Absolute Arrival Times
   (d) Computation of Local Atmospheric Time Errors
   4.5 PRN-Code/Carrier-Phase Statistical Noise Filtering
   4.6 Least-Squares Fitting of Range Data
   4.7 Distribution of Computational Load and Resulting Data
   4.8 Determination of Base States Coordinates
5. Conclusion

1. BACKGROUND OF THE INVENTION

The invention relates to the use of satellite position signals to determine the position of a point in space and time. An illustrative system in accordance with the invention permits very rapid surveying and mapping of terrain (e.g., in oil fields, along roads or railroads, in cities, etc.) as well as near-real time tracking of the position of moving objects.

1.1 THE GPS SYSTEM

In the early 1980s, the Global Positioning System (GPS) satellite system began to come on line. GPS will eventually comprise 24 satellites in orbits approximately 11,000 miles above the earth's surface inclined 50 degrees from the equator. The satellites are not in a constant position, but have a 12 hour orbit. At any point on the earth a ground base receiver normally can receive signals from four GPS satellites. The satellites are tracked from ground stations by the U.S. Air Force. A basic explanation of GPS and its use in surveying is given in Hurn, GPS, *A Guide to the Next Utility*, Trimble Navigation 1989, incorporated herein by reference.

(a) PRN Code Information Signals. The GPS satellites each transmit signals containing groups of information that enable distance measurements to be made. FIG. 1 illustrates (not to scale) the transmission of a pseudo-random number (PRN) code from a satellite 105 to a GPS receiver 110. For clarity the two data groups 100 are depicted in the Figure as being separated by a time interval.

The PRN code is a very faint signal which hardly registers above the earth's natural background noise, yet can still be received by an antenna only inches in size. Decoding of these signals is accomplished in known fashion by sampling the PRN code and comparing the code with previously received signals over time, permitting the PRN code to be picked out of the earth's background noise.

The PRN code includes the time (as measured by an atomic clock aboard the satellite) at which the signal left the satellite. Over time, the signals include information about the satellite's current orbit in space as well as corrections for known errors in the satellite's clock (uploaded to the satellite periodically by the Department of Defense).

Two types of services produce signals from the GPS satellites. First, the Precise Positioning Service (PPS) produces for the military the most accurate dynamic positioning possible with GPS, based on the dual frequency Precise or Protected code known as the P-code. Users must have an encryption code to access the P-code which is not available to the public. Standard positioning service (SPS) produces the publicly accessible civilian positioning accuracy obtained by using the single frequency "Clear Acquisition" (C/A) code. The Department of Defense (DoD) has the ability to degrade the accuracy of the C/A code using "selective availability" (S/A) or artificially creating clock errors to prevent hostile military forces (e.g., jet aircraft) from navigating using the C/A code.

(b) Computation of Position Fixes Using GPS Signal Data. The earth-based receiver 110 receives the PRN code and records the receive time as measured by the receiver's clock. Taking relative clock offsets into account, the difference between a signal's departure time and arrival time is the total travel time. The distance from the GPS satellite to the receiver's position is then approximated by multiplying the speed of light times the total travel time (refraction- and other errors must be taken into account as discussed in more detail below).

A minimum of three satellite signals are needed to determine position using GPS satellites. If all that is known is that the position in question is 11,000 miles from a first satellite the position could be anywhere on a sphere centered on that satellite and having an 11,000 mile radius. If two satellite distances are known, the position could be anywhere on a circle where the two satellite-centered spheres intersect. If three satellite distances are known, the position can only be at one of two points at which all three spheres intersect. For a position known to be on earth, one of these points will usually be a ridiculous answer (e.g., somewhere in space), so three satellites are enough to pinpoint a location.

(c) Atomic-Clock Timing of Satellite Signals. Because the speed of light is so fast, it only takes about 6/100ths of a second for a GPS satellite signal to travel to earth. To avoid satellite-distance errors (and therefore position-fix errors) arising from clock errors, very accurate clocks must therefore be used in both the satellite and receiver. GPS satellites use "atomic" clocks, that is, clocks driven by an atomic-standard oscillator, e.g., a cesium- or rubidium-standard oscillator. (Atomic clocks do not necessarily run on atomic energy, but use the oscillations of an atom as their "metronome" to keep extremely accurate time.)

Many satellite receivers use quartz-crystal oscillator clocks of lower accuracy than atomic clocks, whose cost is presently quite high. Collection of PRN code data from a fourth satellite can be made to compute time of arrival (by simultaneously solving four satellite distance equations with four unknowns) using only the satellites' on-board atomic clocks to eliminate the need for an atomic clock on the ground. Even with atomic clocks aboard the satellites, however, some error in timing occurs. Each satellite uses four atomic clocks which are additionally synchronized by the Colorado Springs Falcon Air Force Station with a cluster of clocks, or master time base to keep absolute time. Each satellite's four clocks or master oscillators have individual characteristic drifts. The drift errors are kept defined based on a master time base ("GPS time"). The satellites transmit the timing drift errors as part of the PRN code.

2. SUMMARY OF THE INVENTION

An illustrative system in accordance with the present invention is based on two interesting characteristics of the GPS satellite broadcast system:

PRN code analysis permits fixes of high accuracy but (because of refraction, clock, noise, time-, and ephemeris errors) low precision.

On the other hand, carrier phase-detection techniques permit just the opposite, namely high-precision but (because of uncertainties of carrier-wave identification and phase lock) low-accuracy fixes.

The illustrative system takes into account the near-Gaussian (i.e., essentially random; sometimes referred to herein as simply "Gaussian") nature of errors in PRN code signals as received by a receiver. Instead of computing fixes based on comparatively short, interrupted satellite sessions, the system continously collects data from as many satellites as possible at a number of geographically diverse base stations organized into a network and having highly accurate clock oscillators and high sampling rates. Statistical analysis of the resulting satellite data leads to notably accurate and precise measurements of clock error. If the network of base stations is sufficiently diverse geographically (e.g., distributed across a continent), the system has the ability to model refraction errors and atmospheric signal delays. In some circumstances, satellite orbital position errors can likewise be modeled using the data so acquired.

The illustrative system comprises:

(a) at least three geographically diverse base station satellite-receiver subsystems, each receiver subsystem notably having (1) a clock oscillator of as high accuracy as practicable, e.g., a rubidium-standard atomic clock (or equivalent) or better if possible, (2) a high signal sampling rate, at least one sample per second if possible, and (3) data collection and storage means for collecting both PRN-code and carrier-phase satellite data from all GPS satellites in view, normally over a comparatively long period of time, e.g., continuously over the course of a day;

(b) an arbitrary number of mobile remote receiver station subsystems, likewise having a fast sampling rate as well as data collection and storage means for collecting both PRN-code and carrier-phase satellite data over the course of, e.g., a 10- to 12-hour working session; and (c) data processing means for performing, among other functions, (1) clock synchronization of the clocks at the base stations; (2) a novel signal correction process, performed on raw satellite data received by the base stations and the remote station to yield improved satellite range data at each station, and (3) a novel iterative least-squares analysis of the improved range data to arrive at an improved position fix for the remote station.

In one embodiment, the computations in question are performed in batch "at the end of the day [work period]." In a second embodiment, the computational burden is distributed over the course of a work period and also among the processors at the base stations and remote station. In still another embodiment, computed satellite range-error data are broadcast in near-real time to a potentially large number of users in a region for their use.

By and large, the components of the hardware supporting these embodiments are conventional, albeit meeting certain specifications and arranged in certain novel ways as discussed herein. Similarly, many of the constituent parts of the data processing techniques discussed herein are conventional, but are combined in novel and advantageous ways along with certain new approaches to the data processing problems at hand.

3. BRIEF DESCRIPTION OF THE DRAWINGS

4. DETAILED DESCRIPTION OF SPECIFIC EMBODIMENTS

Figure 1:
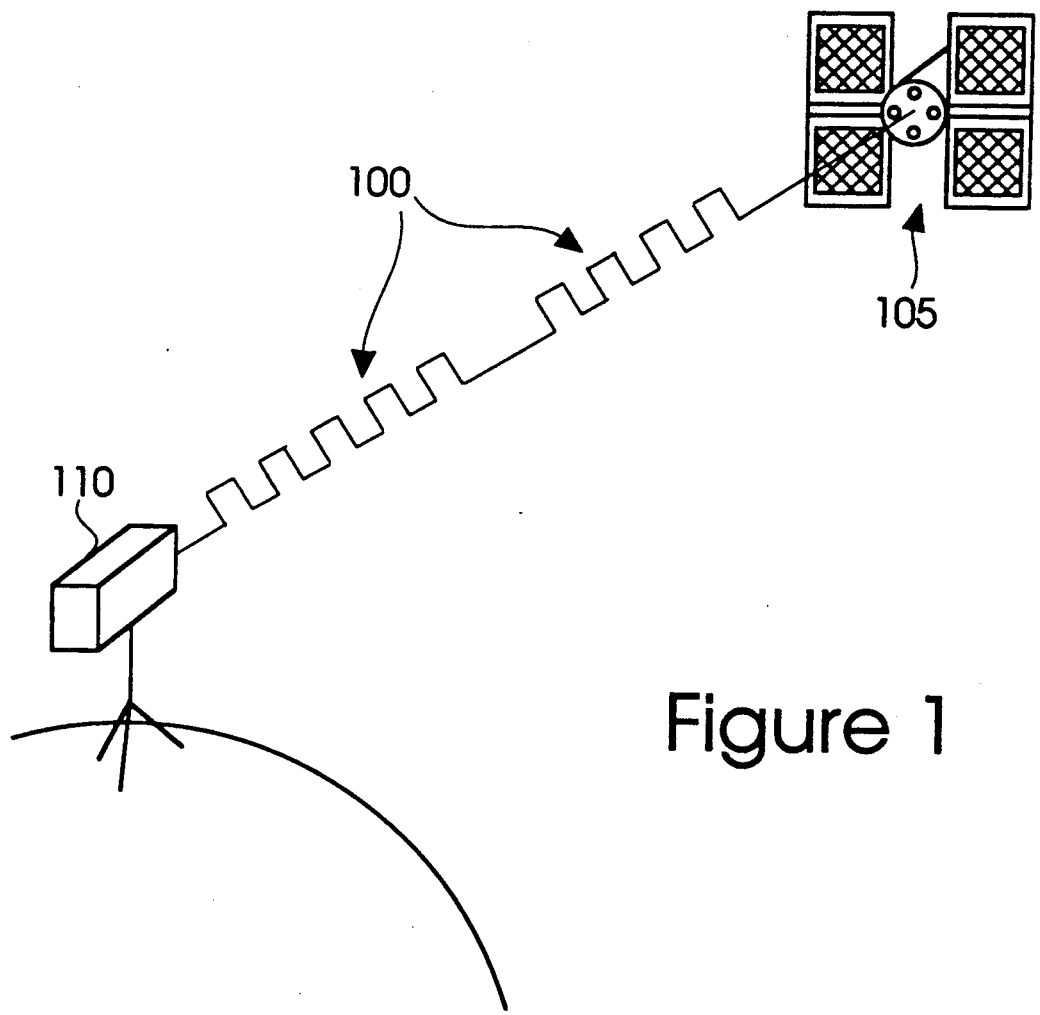
FIG. 1 is a conceptual view (not to scale) of a single GPS satellite broadcasting to a single receiver on earth.
Figure 2:
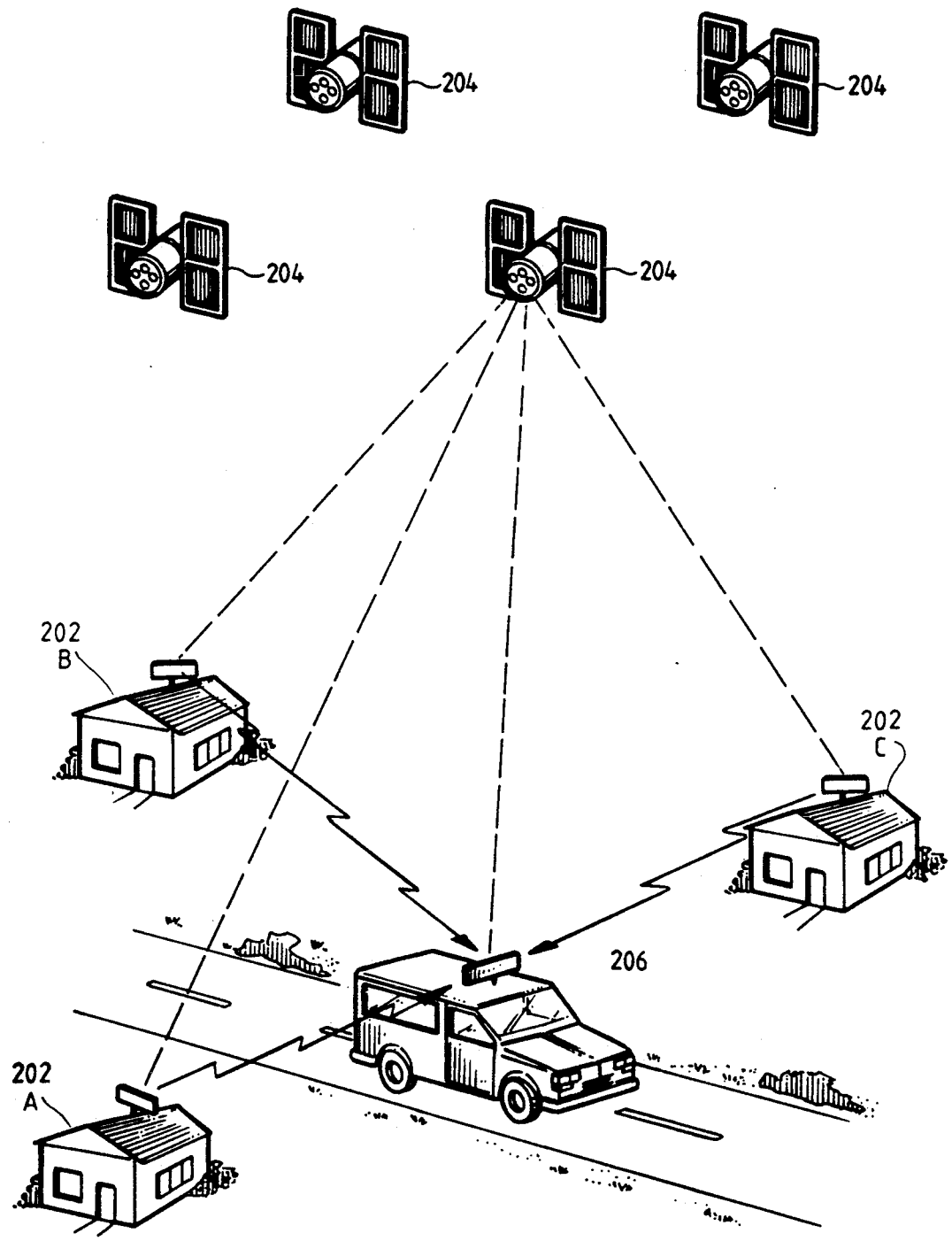
FIG. 2 is a conceptual view (not to scale) of a network of base stations and a mobile remote station receiving signals from the GPS satellite system.
Figure 3:
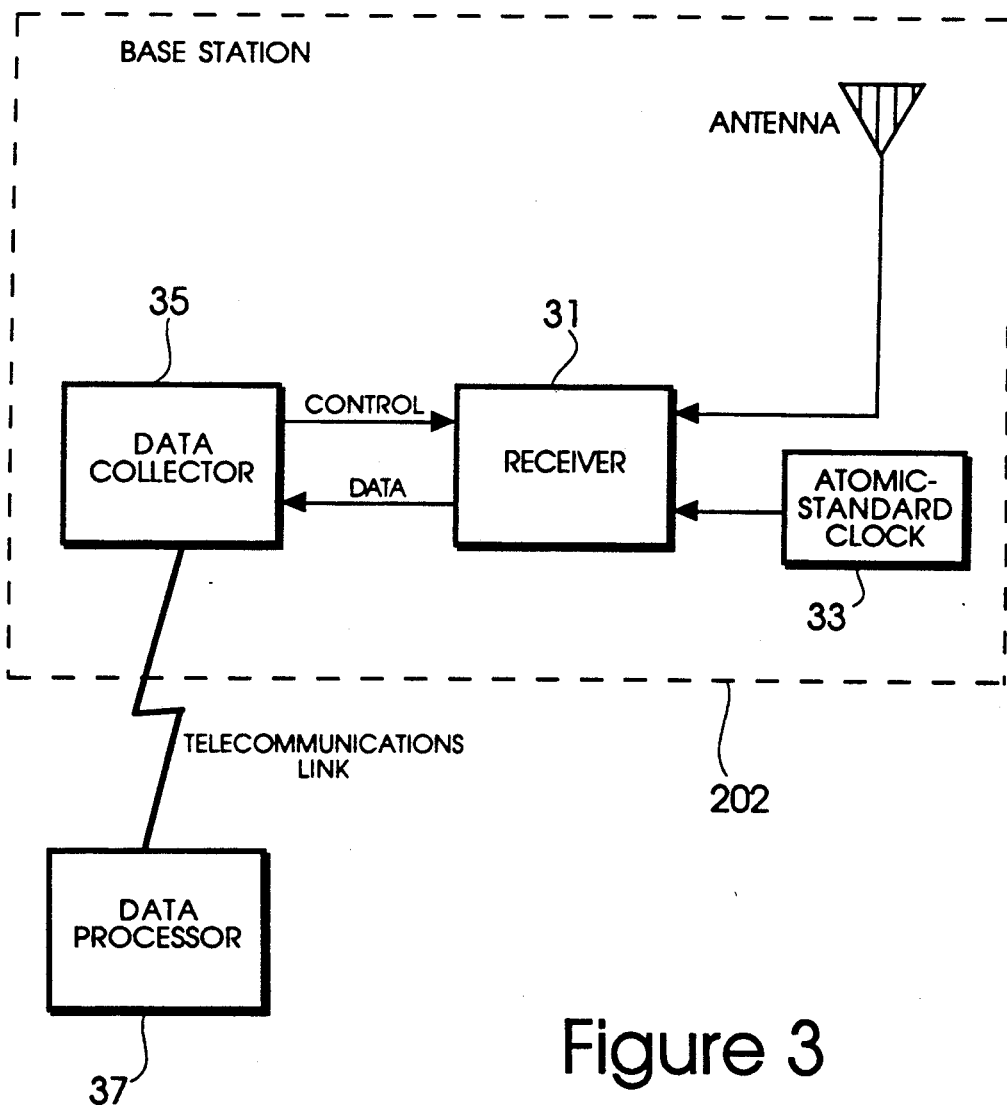
FIG. 3 is a block diagram of components of a typical base station.

4.1 System Components (a) Base Stations. Referring to FIGS. 2 and 3, the illustrative system comprises at least four receiver stations among which are at least three base stations 202, each used to collect satellite data for use as geodetic reference points. The base stations may be spaced approximately 30 to 200 km apart; it is contemplated that their spacing may be as great as 500 km or more. As shown in more detail in FIG. 3, each base station 202 comprises a satellite receiver 31; an oscillator ("clock") 33; and a data collector 35.

The base station satellite receiver 31 may be conventional. Among the models that may be used are, e.g., a Sercel Model NR52 5-channel receiver sold by the Sercel company of Nantes, France; a Magnavox MX 4200 sold by a division of North American Phillips corporation in Torrance, Calif.; or a Trimble 4000AX sold by the Trimble company of Sunnyvale, Calif. The base station receiver has a comparatively high sampling rate to avoid errors arising from divergence of refraction effects on PRN code and carrier waves, preferably at least one sample per second.

The receiver preferably is coupled with as accurate an external (or internal) clock oscillator 33 as practical. Typical receivers are equipped with internal quartz-crystal clocks but also have ports for connecting an external atomic-standard clock. A conventional rubidium-standard atomic clock such as the Efratom rubidium frequency standard Model FRT-1, by Efratom California, Inc., has been found to be acceptable.

The base station data collector 35 may take the form of a conventional personal computer having sufficient disk or other storage space to handle approximately 1.5 megabytes per hour of logged data. A Compaq Deskpro286 having a 12 mHz CPU and a 20 megabyte hard disk (fixed disk) has been found to be suitable, although lower-capability CPUs (e.g., an IBM PC or equivalent, preferably with a turbo-speed Intel 8088 or 8086 CPU) are believed to be acceptable for the data-collection functions. If the base station personal computer collector computer is to perform part of the computations as described herein, an Intel 80287 or other math co-processor or equivalent may be used for improved performance. Suitable data backup equipment (e.g., a CD-ROM drive, a Bernoulli drive, or a streaming tape backup) can also be helpful. Computers of other kinds may of course be readily adapted for the purposes described herein by those of ordinary skill having the benefit of this disclosure.

The base station data collector 35 may be linked to the satellite receiver 31 via an interface such as a conventional cable connection between two standard RS-232 ports or alternatively a conventional RS-422 connection. Data are exchanged between the receiver and the data collector in the form of ASCII character streams. A conventional XON/XOFF protocol may be used to control the flow of data. The receiver typically manages the data exchanges internally (e.g., through the use of software stored in ROM).

Some receiver models (e.g., the aforementioned Sercel and Magnavox receivers) may be controlled by an associated external controller such as a computer that exchanges control signals with the receiver via a control port in the receiver. With suitable conventional programming (in compliance with the control protocols specified by the receiver manufacture), the data collector computer 35 may be used for this purpose. The control signals regulate matters such as which GPS satellites' data to collect on which receiver channels at which times, and the like, in a manner well known to those of ordinary skill.

(b) Remote Station. As shown in FIG. 2, a mobile remote receiver station 206 is used to collect satellite data at points where fixes are desired (an arbitrary number of such remote stations may be used to collect large quantities of data simultaneously). Like the base station, each remote station includes a satellite receiver and a data collector.

The remote station satellite receiver may be of the same kind as the base station receiver 31. An atomic-standard oscillator is not used with the remote station receiver's clock; the clock oscillators included as standard features in the above-identified receivers have been found to be acceptable. The remote station data collector may be similar to those of the base station.

(c) Data Processor. As shown in FIG. 3, a data processor 37 is used to analyze and compare satellite data collected by the base stations and the remote station(s). It may take the form of a conventional personal computer, e.g., a Compaq Deskpro386 having a 25 mHz CPU, 5 megabytes of read-write memory (RAM), an Intel 80387 or Weitek 1167 math coprocessor, and a hard disk (fixed disk) storage device of 100 megabytes or more. The data collector may be controlled by software as discussed below. Computers of other kinds may of course be readily adapted for the purposes described herein by those of ordinary skill having the benefit of this disclosure. A slower or less-capable computer may be used, but as a general proposition, faster is better, especially in connection with real-time or near-real time applications.

4.2 Data Collection Using the Illustrative System

Generally speaking, satellite data (both PRN code and the associated carrier phase data) are collected at each base station 202 and at each mobile remote station 206. Prior to beginning data collection and later as needed during the working session, each receiver is calibrated by acquiring data from the highest-angle satellite in view on all receiver channels, e.g., for six to seven minutes, to detect receiver component drift.

When data collection is initiated, the satellite data are collected continuously at each base station and continuously over the course of, e.g., a 10- to 12-hour work session at each remote station. During data collection at each base station and each remote station, data is collected for each satellite in view at the receiver for as long as the satellite remains in view at the station in question.

The satellite data are "logged" by each data collector computer 35 as the data are received from the receiver. That is, the apparent time of receipt of each data item (as measured by the receiver's clock 33) is noted along with the data item itself. This time of receipt data is used in determining the apparent distance to each satellite.

At the data collector computer 35, a computer program loadable from disk storage is used to manage receipt of the data from the receiver 31 and to store the data in disk storage. A series of four exemplar computer programs written in the BASIC language for performing these functions is shown in Appendix 1, namely STATION1.BAS and DISPBAS1.BAS for entering and displaying the coordinates of the GPS base station to be used; EPHEMLOG.BAS to control a receiver to obtain satellite ephemeris parameters for the satellites in view; and BASE1.BAS to log data from the receiver.

Preprocessing of the satellite data may be useful. It is possible that different types of receiver 31 may deliver ASCII data stream output in different format. For convenience, the data from each receiver may be conventionally preprocessed by the data collector to concatenate and/or arrange the data in a standard format (which may be a "compressed" format to reduce the storage space and/or transmission time required). An exemplar computer program for such preprocessing of data is shown in Appendix 2 as CARCATM1.BAS, written in the BASIC language. This program additionally performs certain quality control functions, e.g., looking for interruptions in the satellite data and determining whether the data are acceptable.

As illustrated in FIG. 2, any mobile remote station 206 may be moving from point to point during the course of a working session. To keep track of this motion, time-tagged annotations are made as desired by a human operator to indicate what point is presently being logged. The entries may be made in, e.g., a laptop computer (or in the data collector computer of the remote station if that computer is running a multitasking operating system) using any convenient input device, e.g., a keyboard, a pointing device such as a mouse, or a voice-recognition input system. The operator might enter the equivalent of, e.g., "I'm now at the intersection of Main Street and Broad Street". An exemplar computer program in dBase langauge for managing and recording such annotations, SPC5.PRG, is shown in Appendix 3.

The satellite data so collected may be transferred for processing to the data processor 37 in any convenient manner, e.g., via conventional telecommunications systems, conventional satellite links, or overnight package data shipment.

4.3 Introduction to Data Processing Aspects

In one embodiment, collected satellite data is processed post-mission. At the end of a data collection period (referred to herein for convenience as a "day"), a series of computations is performed on the logged satellite data. Alternatively, it is contemplated that many of the computations that involve purely local data can be computed "on the fly" during the course of a day at each base station and at each remote station, using the stations' local computational resources.

The specific processing steps applied to the logged data are disclosed in Appendix 4, which includes the source code of a pilot-project version of the software written in BASIC as well as the source code of a more recent C-language version of the software, written for the NDP C386 compiler distributed by the Microway corporation of Kingston, Mass. and linked using the well-known Phar Lap DOS-extender package. The BASIC source code in Appendix 3 includes variable names adapted largely from a standard publication, ICP 200 (ICP stands for [Interface Control Document]), published by the GPS Program Office at Los Angeles Air Force Station, California, as well as comments explaining certain aspects of the software. The next several sections explain those processing steps in general terms.

4.4 Time Synchronization of Station Clocks

A set of synchronization corrections discussed in this section is applied to the logged data to synchronize the clocks of the geographically dispersed base stations 202. Over a comparatively long period of time, the GPS satellite signals received at are processed statistically to reduce the effect of natural and intentional errors; As a result, a large, "rigid" network of base station clocks is established that, over time periods allowing for statistically significant sampling, is capable of keeping highly accurate and precise time.

(a) Overview: Obstacles to Synchronizaton. Synchronization of base station and remote station clocks can conceptually be accomplished by referring to satellite broadcast data, i.e., by noting the satellite's predicition of its own orbital position and of its own clock error relative to the "GPS time" frame of reference maintained by the Department of Defense. Conceptually, the difference between the measured arrival time of a given satellite signal at a base station and the predicted arrival time (based on the satellite broadcast data just mentioned) should give an indicaiton of the station clock's offset (and over time its drift) relative to GPS time.

Errors exist in numerous aspects of the computations involved, however:

A satellite's predicted-orbit data broadcasts may be in error by about a meter;

The satellite's predicted clock error data broadcasts may likewise be in error (in part because "GPS time" itself drifts);

Satellite signals arrive at station receivers slightly later than would be predicted, because of propagation-path errors (ionospheric refraction, tropospheric refraction, multi-path reflection);

Channel-calibration errors may exist in the station receiver, i.e., different channels of the same receiver may be calibrated slightly differently (the calibration techniques described above can largely compensate for those particular errors);

Code-correlation noise in the station receiver's correlation of PRN code signals, which limits how well the arrival time of any given signal at the receiver is known with respect to the local clock time;

Offsets among the local atomic clocks at the various base stations, compounded by nonuniform drift of varying degrees at each clock. Rubidium-standard oscilators typically have a stability of aobut 2 to 3 parts in $10^{13}$; over 1,000 seconds, such drift could be equivalent to about 0.2 feet to 0.3 feet;

Errors in the absolute geodetic coordinates of the base stations, which can introduce a undesirable time offset with respect to GPS time (which in turn can affect atmospheric modeling). For base stations 200 km apart, with a desired precision 10 cm (i.e., plus or minus 0.5 wavelength, where the wavelength of the GPS signals is 19 cm), errors must be less than 1:2000,000. Incidentally, errors in government control points are typically 1:200,000 (i.e., 1 meter in 200 km), which cannot resolve ambiguities in carrier waves as is addressed in the method steps described below;

Propagation-path differences among the base stations;

Relative coordinate errors among the base stations, which affect the accuracy of time synchronization;

Simultaneous-sampling errors (which arise in some conventional systems that attempt to force simultaneous sampling in lieu of computing absolute arrival times of satellite signals);

Differences between "earth time" and GPS time, which can arise from, e.g., minute wobbles in the earth's rotation.

(b) Selection of Reference Base Station. A reference base station 202 is selected in either the end of the day approach or the on the fly approach, principally so that its clock 33 may be used as a standard time reference.

Normally, the base station 202 closest to the remote station 206 is selected as the reference base station because that base station presumably experiences atmospheric refraction that is the closest to that experienced by the remote station 206. Alternatively, a base station 202 may be selected because it is experiencing the least refraction error or tropospheric-delay error at the time, or because its clock has been empirically determined to be the least susceptible to drift.

(c) Computation of Absolute Arrival Times. A very close approximation of absolute time at each base station and the remote station is calculated. This calculation is possible because by design, all base stations 202 receive satellite signals from all satellites in view, and the remote station 206 continously receive signals from at least four satellites 204, in common at any given time. (More precisely, fixes are computed using only satellite data that was obtained during time periods in which all the base stations 202 and the remote station 206 continously receive signals from at least four satellites 204 in common at any given time.) Thus, signals from each of those satellites in view during the time period in question are received by all the base stations; signals from four to six (typically) satellites are received at the remote station during the remote station's work session.

Each satellite is broadcasting, with each time tick, its prediction of instantaneous GPS time (i.e., its clock time and the clock's predicted offset from GPS time). Furthermore, the geometric coordinates of all base stations 202 are known to an accuracy of 1:2,000,000 or better, and the geometric coordinates of the remote station 206 are approximately known (albeit to a much lower degree of accuracy). Computation of these coordinates is explained below in Section 4.8. This permits the estimation of the respective clock offsets and drifts of the base stations 202 and remote station 206.

For each time $t_i$ within a period during which receiver clock errors accumulate at a rate less than 0.1 nanoseconds, data signals are received at a given base station 202 from all satellites $SV_j$ in view, each of which is at least 10° and preferably at least 12° to 14° above the horizon at the station in question. As discussed above in Section 1.1(a), the signals from each satellite $SV_j$ include not only time ticks but also orbital-position information about the satellite itself and clock offset and drift-rate information about the satellite's atomic clock. (The signals received are noise-filtered in the manner described below in Section 4.5.)

For each base station, at each time epoch $t_i$, the predicted "absolute" GPS times of the signals' respective arrivals at a base station are computed, from the satellite time- and position data embodied in the signals and from the known coordinates of the base station, by simultaneously solving the resulting time-distance equations for each satellite $SV_j$ in view. As to each satellite $SV_j$, the difference between the time of arrival as predicted by the foregoing computation and as observed relative to the the base station clock is treated as an absolute-time offset T of the base station clock with respect to GPS time:

$$TC_{A,i,j} - TO_{A,i,j} = \Delta T_{A,i,j}$$

where $TC_{A,i,j}$ is the computed arrival time, and $TO_{A,i,j}$ the observed arrival time with respect to the base station clock, for a base station A at time i with respect to satellite $SV_j$.

For a base station A (for example), these satellite-specific offsets are then averaged for all satellites $SV_j$ in view at the time $t_i$ in question to produce a mean absolute offset $\Delta T_{A,i}$(mean). These means are themselves averaged (over lengths of time which are small with respect to the anticipated drift rate of the atomic clock of the base station, usually only several seconds) to refine the estimate of absolute offset in the presence of code-correlation noise. By computing a moving average of these means over a 20- to 30-minute time period (using a linear polynomial regression for a rubidium-standard clock, or a second-order regression for a quartz-crystal clock), the base station atomic clock drift rate can be estimated as well.

Well-established "time transfer" procedures are then used iteratively to obtain a statistical aggregate among all base station atomic clocks. This results in the development of "network" time (as represented by the base station clocks taken as an aggregate) versus GPS time (as represented by all GPS satellites taken as an aggregate). In other words, all base station clocks are advantageously brought into a common time reference.

At this writing (October, 1990), 15 GPS satellites are in orbit, permitted a demonstration of the practicability of various implementations. When the GPS system is completed, 24 satellites will be in orbit; over any 24-hour period, each satellite will be observed in at least two portions of its orbit, thus increasing the accuracy of the aggregate of GPS time. Consequently, as more base stations are established having atomic-standard clocks and accurately-known coordinates, a tighter link between network time and GPS time should be possible.

(d) Computation of Local Atmospheric Time Errors. With a geographically diverse network of base stations tied to "network" time (which in turn is tied to GPS time), ionospheric and tropospheric refraction can be modeled and thereby distinguished from unmapped satellite clock drift. This is done through a parametric analysis of ionospheric refraction as set forth in ICD 200, and of tropospheric refraction as set forth in a well-known paper by Helen Hopfield of Johns Hopkins University Applied Physics Laboratory, continuously refining the model over time.

Generally speaking, satellite timing errors are modeled with respect to elevation angle as simultaneously observed at the several base stations. As different satellites are observed over a wide range of azimuths and elevation angles, the errors are separated into parameters for refraction and short-arc components of orbital ephemeris error.

After application of the refraction model, individual base-station clock errors are removed with respect to "network" time.

4.5 PRN-Code/Carrier-Phase Statistical Noise Filtering

Using a starting range to each satellite as computed from the satellite's PRN code as a seed value of range (initially corrected with the computed range error to the satellite as measured at the reference base station), the changes in range as measured on the carrier (by counting cycles of carrier phase) are accumulated for continuous intervals of time. After at least two minutes but usually not in excess of 30 minutes (depending on sampling rate, with the preferred number of samples being in excess of 1,000 and usually about 2,000), point-by-point fitting is performed of the raw ranges derived from the PRN code signals with the integrated ranges of differential carrier measurements as initiated by the starting seed value. The offset and drift are solved for by linear to second-order regression (e.g., least-squares or polynomial regression).

This provides a "hybrid" data set of range measurements which have times whose accuracy is derived from the PRN code and whose precision is derived from the carrier phase tracking loop of the station receiver. The advantage over some hardware implementations that are believed to have been made of similar filtering concepts is that the least-squares process allows editing of unwanted spikes in the data which might otherwise contaminate the data set.

4.6 Least-Squares Fitting of Range Data

After noise-filtering the PRN code data as described in the previous section, the illustrative system performs a least-squares fitting of the resulting satellite range data to correct timing and geometric errors (which are unaffected by the noise-filtering). The illustrative system applies an innovative adaptation of the well-known method of variation of coordinates by processing a time series of satellite range-and position data from at least three base stations 202 as well as from the remote station 206.

The noise-filtered range data for all base stations 202 (three of which are respectively labeled A, B, and C in FIG. 2 for convenience), and for the remote station 206 (labeled D), at each time $t_i$, are stored in disk storage in a three-dimensional array. Typically, the dimensions of the array will be roughly 4×1000×10, that is:

- four receivers at a time (three base stations, one remote);
- usually about 1000 time points $t_i$ for which satellite ranges are being processed at any given time; and
- roughly 10 or fewer satellites being processed at any time. Most remotes will not have more than six or eight at a time, but some base stations will sometimes have 12 at a time.

Thus, the total number of elements in the array is about 40,000.

An initial estimate is made of the remote station's position (latitude, longitude, height, time). This initial position estimate is the same as that computed in determining the initial seed value for PRN-code noise filtering as discussed above in Section 4.5. If the remote station is moving, the previous position fix is used as the first estimate of the new position.

Now taking the above-described initial estimate of the remote-station position as a given, a computed range $CR_{0,j}$ from the remote station 206 to each satellite $SV_j$ in view at the remote station at each time $t_i$ is determined. Each computed range, of course, may be readily determined by comparing the initial-position estimate with the orbital position of the satellite 204, an approximation of which is broadcast by the satellite as part of its PRN-code transmission as discussed in Section 1.1(a).

Using the initial-position estimate as an initial input, a series of correction- and recomputation operations is performed. The goal of the operations is to find a set of corrections to apply to the estimate of latitude, longitude, height, and time, that minimizes the sum of the squares of a series of error terms $\epsilon$ for each $t_i$, where:

$$\epsilon(A)_{SV(j)} = CR(A)_{SV(j)} - MR(A)_{SV(j)}$$

$CR(A)_{SV(j)}$ = computed distance between current estimate of (lat, long, ht) as indicated in the current ephemeris to the ECEF coordinates in a geodetic frame of reference of the satellite $SV_j$ $$MR(A)_{SV(j)} = C^*[t(arrival)_{local\ clock} + \Delta t_A]$$

For example, if three base stations are used with four satellites to determine a fix for a remote station, it follows that for each time $t_i$, 12 simultaneous error equations exist, i.e., one for each satellite for each base station for that time. The goal is to minimize the sum of the squares of all 12 error terms. If, say, three base stations are used with six satellites, a total of 18 error equations exist.

According to Gaussian theory, the estimate of latitude, longitude, and height that results in the minimum sum of squares provides the closest estimate to true position.

If the antenna is stationary, a group of independent position fixes are averaged. If the antenna is moving, consecutive position fixes are used to establish antenna velocity as well as position.

4.7 Distribution of Computational Load and Resulting Data

In one embodiment, all satellite data are brought to a central location for computation of fixes in a post-mission mode. In another embodiment, preprocessing and other computational burdens (e.g., PRN-code noise filtering) may be done locally at each base station and remote station. The base station data are then transmitted via a communication link (e.g., a telephone modem or a satellite link) to a central facility for combining error terms and computation of position fixes for remote units in regions of base station coverage whose raw range measurements have been transmitted (or polled) to the central computation facility in near-real time. In still another embodiment, satellite range error data are combined and broadcast regionally for use by multiple users for neal real-time computation of accurate antenna positions.

4.8 Determination of Base Station Coordinates

All processing of the logged satellite data from all receivers depends on the assumption that the respective locations of the base stations 202 are known precisely. Obtaining a precise, accurate fix on the base stations is a special case of the same process used to do the same for mobile remote stations.

Three or more base stations are set up in arbitrary, unknown locations. The locations are set up for convenient uninterrupted operation with a clear horizon for reception of satellite signals. The locations are preferably chosen for a benign environment in which the base stations are safe from intrusion and which the computers and other equipment have access to reasonable sources of electrical power.

All base stations are set to collecting satellite data continously. Local government control points (geodetic triangulation stations and elevation benchmarks) are visited. A single conventional differential GPS fix is taken, using a mobile remote station to measure the location of one base station with respect to a control point. Fixes to each of two or three control points can be taken if the first control point is suspected of having unacceptable error. The purpose of this fix is to determine a "seed" value for that base station's position.

Using the seed position value, the relative positions of the other base stations are computed in the manner described above, using several days' worth of satellite observations-A to B, B to C, C to A. These relative positions are "tightened" by using two stations together to measure the position of the third, i.e., the position of C with respect to A and B, of B with respect to A and C, and of A with respect to B and C.

New base stations, as they are added, are tied in to the previous stations in the network using several days' satellite observations apiece. For example, the position of new base station D is determined with respect to A, B, and C. In other words, a "rigid frame" of base stations is extended through the use of long-term observations. The atomic clocks at each base station are "synchronized" as discussed in Section 4.4; the more stations are added, the more "rigid" the frame becomes.

Finally, more control points (dozens) are visited with mobile remote stations. The control points' positions are fitted to the base station network, using a least-squares approach. This permits fix results obtained using the illustrative system to be translated into standard government coordinates.

5. Conclusion

The illustrative system offers a number of advantages over conventional surveying and location systems and methods, even those based on conventional GPS technology. For example, the base stations can be left largely unattended because they collect data essentially continuously and thus do not need constant or frequent attention. The illustrative system may be used for real-time separate tracking of trucks, rail cars (in motion or detached on sidings), intermodal containers, aircraft, hazardous materials, rent cars; receiver/transmitter subsystems on each vehicle or other item can be interrogated periodically (e.g., over a cellular phone network) to ascertain the position of the item. The system may similarly be used for road repair work and railway repair work by permitting percise and accurate location of defects that are difficult to observe but once observed were surveyed and mapped. Surveying of land areas can be done more quickly and with less cost than through the use of conventional systems.

What is Claimed is:

1. A method for determining the position coordinates of a GPS satellite receiver of unknown position, referred to as a mobile receiver, with respect to the earth's surface, comprising the steps of:
   (a) accumulating at said mobile receiver a plurality of code signals and carrier-phase signals broadcast by four or more GPS satellites;
   (b) computing, as a function of accumulated signals, a position fix of the mobile receiver with respect to a network of at least three geographically dispersed base station receivers;
   (c) each said base station receiver having position coordinates that are known to a high degree of accuracy with respect to the position coordinates of the other base station receivers; and
   (d) each said base station receiver having a clock with
      (1) a direct measured time differential with respect to the clocks of the other base station receivers and
      (2) an estimated time differential with respect to an absolute time reference.

2. A method for determining the position coordinates of a GPS satellite receiver of unknown position, referred to as a mobile receiver, with respect to the earth's surface, comprising the steps of:
   (a) accumulating code signals and carrier-phase signals broadcast by four or more GPS satellites, said accumulation taking place simultaneously at:
      (1) at least three geographically dispersed fixed reference station receivers, referred to as base station receivers, each having:
         (A) a set of position coordinates known to the order of 10 cm with respect to the other base station receivers, and
         (B) a clock having a direct measured time differential with respect to the clocks of the other base station receivers and an estimated time differential with respect to an absolute time reference, and
      (2) the mobile receiver;
   (b) computing an initial estimate of a set of maximum-likelihood position coordinates of the mobile receiver;
   (c) noise-filtering the accumulated code signals, utilizing information derived from the accumulated carrier-phase signals;
   (d) correcting the initial position estimate with a correction for timing, refraction, and geometric error, said correction simultaneously minimizing the sum of squares of the difference between:
      (1) the corrected initial position estimate, and
      (2) a set of three or more independent differential position estimates of the mobile receiver, each differential position estimate being computed as a function of the differences in reception times of said satellite signals at a specified base station receiver and at the mobile receiver.

3. A method as in claim 2, further comprising the step of computing said measured time differential and said estimated time differential for each base station clock as a function of code signals accumulated from said GPS satellites over a long period of time.

4. A method as in claim 2, further comprising the step of computing said position coordinates of the base station receivers as a function of code signals accumulated from said GPS satellites over a long period of time.

5. A method as in claim 2, wherein the base stations are at least 50 km apart.

6. A method for determining the position coordinates of a GPS satellite receiver of unknown position, referred to as a mobile receiver, with respect to the earth's surface, comprising the steps of:
   (a) computing a set of measured relative time differentials among at least three clocks respectively coupled to at least three fixed reference station receivers geographically dispersed at least 50 km apart, referred to as base station receivers, as a function of code signals accumulated at said receivers from one or more GPS satellites over a long period of time;
   (b) computing said position coordinates of the base station receivers to the order of 10 cm as a function of code signals accumulated at said receivers from said GPS satellites over a long period of time;
   (c) accumulating code signals and carrier-phase signals broadcast by four or more GPS satellites, said accumulation taking place simultaneously at said base station receivers and at said mobile receiver;
   (d) computing an initial estimate of a set of maximum-likelihood position coordinates of the mobile receiver;
   (e) noise-filtering the accumulated code signals, utilizing information derived from the accumulated carrier-phase signals; and
   (f) correcting the initial position estimate with a correction for timing, refraction, and geometric error,
   (g) said correction simultaneously minimizing the sum of squares of a set of at least three independent differential error estimates,
   (h) each said differential error estimate being computed as a function of the differences between the reception times of said satellite signals at a specified base station receiver and at the mobile receiver.

* * * * *